(12) United States Patent
Wang et al.

(10) Patent No.: US 11,106,100 B2
(45) Date of Patent: Aug. 31, 2021

(54) DISPLAY SUBSTRATE, DISPLAY PANEL, DISPLAY DEVICE AND MANUFACTURING METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Mingchao Wang, Beijing (CN); Junwei Wang, Beijing (CN); Xiaopeng Cui, Beijing (CN); Weitao Chen, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/851,404

(22) Filed: Apr. 17, 2020

(65) Prior Publication Data
US 2021/0149258 A1    May 20, 2021

(30) Foreign Application Priority Data
Nov. 15, 2019   (CN) .......................... 201911117927.2

(51) Int. Cl.
*G02F 1/1362*    (2006.01)
*G02F 1/1333*    (2006.01)
(Continued)

(52) U.S. Cl.
CPC .... *G02F 1/136204* (2013.01); *G02F 1/13338* (2013.01); *G02F 1/133514* (2013.01); *G02F 1/133516* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 2012/0218199 A1* | 8/2012 | Kim | G09G 3/3648 345/173 |
| 2013/0135540 A1* | 5/2013 | Nam | G02F 1/13338 349/12 |

(Continued)

FOREIGN PATENT DOCUMENTS

CN    203444454 U  *  2/2014

OTHER PUBLICATIONS

English translation of CN-203444454-U, Title: Capacitive touch screen, Author: Lu Youqiang; Qiu Yun; Wang Jing; Date of publication: Feb. 19, 2014 (Year: 2014).*

*Primary Examiner* — Shan Liu
(74) *Attorney, Agent, or Firm* — The Webb Law Firm

(57) ABSTRACT

The present application provides a display substrate, a display panel, a display device and a manufacturing method thereof. The display substrate comprising: a base substrate and a black matrix layer, a color resistance layer and an electrostatic transmission layer arranged on the base substrate, wherein the base substrate comprises a first surface and a second surface opposing to each other, the black matrix layer and the color resistance layer are arranged on the first surface of the base substrate and arranged on the same layer, and the electrostatic transmission layer for leading out static electricity generated by the base substrate is arranged on the second surface of the base substrate, and wherein an orthographic projection of the electrostatic transmission layer on the base substrate does not overlap with an orthographic projection of the color resistance layer on the base substrate.

14 Claims, 5 Drawing Sheets

(51) Int. Cl.
    *G06F 3/041*         (2006.01)
    *G02F 1/1335*      (2006.01)

(56) References Cited

U.S. PATENT DOCUMENTS

| | | | | |
|---|---|---|---|---|
| 2013/0271683 | A1* | 10/2013 | Jang | G02F 1/136204 |
| | | | | 349/42 |
| 2014/0061597 | A1* | 3/2014 | Choi | G06F 3/0446 |
| | | | | 257/40 |
| 2016/0146991 | A1* | 5/2016 | Li | G02F 1/133512 |
| | | | | 359/885 |
| 2016/0209688 | A1* | 7/2016 | Kim | G06F 3/0412 |
| 2017/0336684 | A1* | 11/2017 | Okazaki | G02F 1/1368 |
| 2018/0031905 | A1* | 2/2018 | Chen | G02F 1/133512 |
| 2018/0182816 | A1* | 6/2018 | Kang | H01L 51/5281 |

* cited by examiner

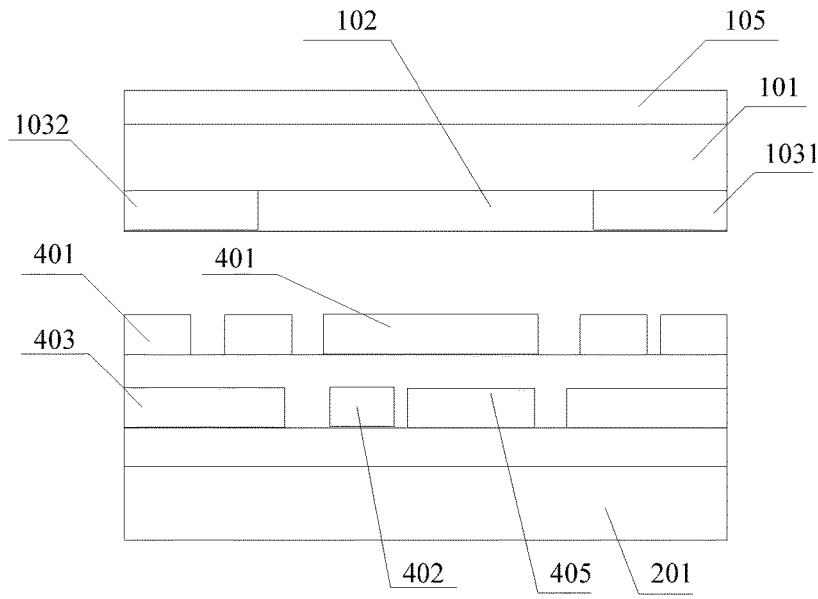

FIG. 7

| providing a base substrate, wherein the base substrate comprises a first surface and a second surface opposing to each other | 801 |

| forming a black matrix layer and a color resistance layer on the first surface of the base substrate, wherein the black matrix layer and the color resistance layer are arranged on the same layer | 802 |

| forming an electrostatic transmission layer on the second surface of the base substrate, wherein the electrostatic transmission layer is configured to lead out static electricity generated by the base substrate, wherein an orthographic projection of the electrostatic transmission layer on the base substrate does not overlap with an orthographic projection of the color resistance layer on the base substrate | 803 |

FIG. 8 forming a display substrate, comprising: providing a base substrate, wherein the base substrate comprises a first surface and a second surface opposing to each other; forming a black matrix layer and a color resistance layer on the first surface of the base substrate, wherein the black matrix layer and the color resistance layer are arranged on the same layer; and forming an electrostatic transmission layer on the second surface of the base substrate, wherein the electrostatic transmission layer is configured to lead out static electricity generated by the base substrate, and wherein an orthographic projection of the electrostatic transmission layer on the base substrate does not overlap with an orthographic projection of the color resistance layer on the base substrate ~901 forming a counter substrate comprising a grounding layer ~902 forming a connection electrode for connecting the electrostatic transmission layer with the grounding layer ~903 aligning the display substrate with the counter substrate ~904 filling a liquid crystal layer between the display substrate and the counter substrate ~905

FIG. 9

DISPLAY SUBSTRATE, DISPLAY PANEL, DISPLAY DEVICE AND MANUFACTURING METHOD THEREOF

CROSS-REFERENCE TO RELATED APPLICATION

This application claims priority to Chinese Patent Application No. 201911117927.2, filed on Nov. 15, 2019, the disclosure of which is hereby incorporated by reference in its entirety.

TECHNICAL FIELD

The present application relate to a display substrate, a display panel, a display device and a manufacturing method thereof.

BACKGROUND

Touch Display Driver Integration (TDDI) integrates a touch chip and a display chip into a single chip, and is a currently popular In-Cell Touch technology. The related TDDI products will generate a large amount of electrostatic accumulation when a Color Filter (CF) Polarizer (Pol.) protective film is peeled off, thereby resulting in a whitening picture.

Thus, there is a need for an improved TDDI.

SUMMARY

In an aspect, an embodiment of the present application provides a display substrate comprising: abase substrate; and a black matrix layer, a color resistance layer and an electrostatic transmission layer arranged on the base substrate, wherein the base substrate comprises a first surface and a second surface opposing to each other, the black matrix layer and the color resistance layer are arranged on the first surface of the base substrate and arranged on the same layer, and the electrostatic transmission layer for leading out static electricity generated by the base substrate is arranged on the second surface of the base substrate, wherein an orthographic projection of the electrostatic transmission layer on the base substrate does not overlap with an orthographic projection of the color resistance layer on the base substrate.

In an example, an orthographic projection of the black matrix layer on the base substrate covers the orthographic projection of the electrostatic transmission layer on the base substrate.

In an example, the electrostatic transmission layer is made of a material comprising indium tin oxide, metal and graphene.

In an example, the electrostatic transmission layer comprises: a plurality of electrostatic transmission units arranged in a matrix.

In an example, the display substrate further comprises a polarizer located on a side of the electrostatic transmission layer away from the base substrate.

In another aspect of the present application, an embodiment of the present application provides a display panel comprising the display substrate stated above, a counter substrate arranged opposite to the display substrate and a connection electrode, wherein: the counter substrate comprises a grounding layer; and the connection electrode is configured to connect the electrostatic transmission layer in the display substrate with the grounding layer.

In an example, the connection electrode comprises a silver glue dot, a conductive cloth and a conductive tape.

In an example, one end of the silver glue dot is lapped on the grounding layer of the counter substrate, and the other end of the silver glue dot is lapped on the electrostatic transmission layer of the display substrate.

In an example, the display panel comprises a display area and a non-display area surrounding the display area, the display area includes a plurality of touch electrodes and a plurality of drive signal lines, and adjacent touch electrodes are connected by the drive signal lines; the electrostatic transmission layer comprises a first transmission region and a second transmission region, the first transmission region is located in the display area, and the second transmission region is located in the non-display area; orthographic projections of the first transmission region and the touch electrode on the base substrate do not overlap, and orthographic projections of the first transmission region and the drive signal line on the base substrate do not overlap; and orthographic projections of the second transmission region and the drive signal line on the base substrate do not overlap.

In an example, the display area further comprises a plurality of pixel electrodes and a plurality of data signal lines; the pixel electrodes, the data signal lines and the drive signal lines are arranged on the same layer.

In an example, the display panel further comprises a liquid crystal layer arranged between the display substrate and the counter substrate; and the liquid crystal layer adopts positive liquid crystal molecules.

In an example, an orthographic projection of the black matrix layer on the base substrate covers the orthographic projection of the electrostatic transmission layer on the base substrate.

In an example, the electrostatic transmission layer comprises: a plurality of electrostatic transmission units arranged in a matrix.

In an example, the display substrate further comprises a polarizer located on a side of the electrostatic transmission layer away from the base substrate.

In yet another aspect of the present application, an embodiment of the present application provides a display device comprising: the display panel as stated above.

In still another aspect of the present application, an embodiment of the present application provides a method of manufacturing a display substrate, comprising: providing a base substrate, wherein the base substrate comprises a first surface and a second surface opposing to each other; forming a black matrix layer and a color resistance layer on the first surface of the base substrate, wherein the black matrix layer and the color resistance layer are arranged on the same layer; and forming an electrostatic transmission layer on the second surface of the base substrate, wherein the electrostatic transmission layer is configured to lead out static electricity generated by the base substrate, and wherein an orthographic projection of the electrostatic transmission layer on the base substrate does not overlap with an orthographic projection of the color resistance layer on the base substrate.

In an example, forming an electrostatic transmission layer on the second surface of the base substrate comprises: forming the electrostatic transmission layer on the second surface of the base substrate by a coating etching process.

In another aspect of the present application, an embodiment of the present application provides a method of manufacturing a display panel, comprising: forming a display substrate, comprising: providing a base substrate, wherein the base substrate comprises a first surface and a second surface opposing to each other; forming a black matrix layer and a color resistance layer on the first surface of the base substrate, wherein the black matrix layer and the color resistance layer are arranged on the same layer; and forming an electrostatic transmission layer on the second surface of the base substrate, wherein the electrostatic transmission layer is configured to lead out static electricity generated by the base substrate, and wherein an orthographic projection of the electrostatic transmission layer on the base substrate does not overlap with an orthographic projection of the color resistance layer on the base substrate; forming a counter substrate comprising a grounding layer; forming a connection electrode for connecting the electrostatic transmission layer with the grounding layer; aligning the display substrate with the counter substrate; and filling a liquid crystal layer between the display substrate and the counter substrate.

Additional features and advantages of the present application will be set forth in the description which follows, and in part become obvious from the description, or may be learned by carrying out the present application. Other advantages of the present application may be achieved and attained by the solutions described in the description, the claims, as well as the accompany drawings.

BRIEF DESCRIPTION OF THE DRAWINGS

The accompanying drawings are intended to provide an understanding of the technical solutions of the present application, constitute a part of the specification, and together with the embodiments of the present application, serve to explain the technical solutions of the present application without limiting them.

FIG. 7 is a sectional view taken along line E-E' of FIG. 2;

FIG. 8 is a schematic flowchart showing a method of manufacturing a display substrate according to an embodiment of the present disclosure; and FIG. 9 is a schematic flowchart showing a method of manufacturing a display panel according to an embodiment of the present disclosure.

DETAILED DESCRIPTION

In order to make the objectives, technical solutions and advantages of the present application clearer and more comprehensible, the embodiments of the present application are described in the following in detail with reference to the accompanying drawings. It should be noted that the embodiments in the present application and features of the embodiments may be arbitrarily combined with each other without conflicts.

Unless otherwise defined, technical or scientific terms used in the disclosure of the embodiments of the present application should have ordinary meanings as understood by one of ordinary skill in the art to which the present application pertains. The use of "first," "second," and the like in the embodiments of the present application is not intended to indicate any order, quantity, or importance, but rather is used to distinguish one element from another. The word "comprise" or "include", or the like, means that an element or item preceding the word covers elements or items listed after the word and their equivalents, without excluding other elements or items.

Figure 1:
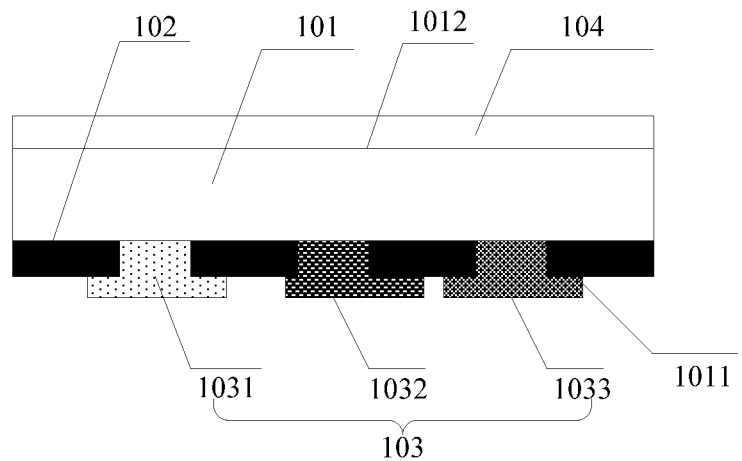
FIG. 1 is a schematic structural diagram showing a display substrate according to an embodiment of the present disclosure.

An embodiment of the present application provides a display substrate. FIG. 1 is a schematic structural diagram showing the display substrate provided in the embodiment of the present application. As shown in FIG. 1, the display substrate provided in the embodiment of the present application comprises: a base substrate 101, and a black matrix layer 102, a color resistance layer 103 (including a first color resistance 1031, a second color resistance 1032 and a third color resistance 1033) and an electrostatic transmission layer 104 arranged on the base substrate 101.

The base substrate 101 comprises a first surface 1011 and a second surface 1012 opposing to each other. The black matrix layer 102 and the color resistance layer 103 are arranged on the first surface 1011 of the base substrate 101 and arranged on the same layer, and the electrostatic transmission layer 104 is arranged on the second surface 1012 of the base substrate 101, for leading out static electricity generated by the base substrate 101.

The display substrate provided by the embodiment of the application, by providing the electrostatic transmission layer 104 on the second surface 1012 of the base substrate 101, enables the static electricity generated by the base substrate 101 to be quickly led out through the electrostatic transmission layer 104, thereby effectively preventing bad phenomena such as static electricity when peeling off the film.

In the related art, static electricity is discharged through a silver glue dot mainly using negative liquid crystal and low-resistance CF pol., which solves the problem of whitening picture but has the following phenomena:

(1) the negative liquid crystal has a high drive voltage, and the power consumption of the screen body is increased accordingly;

(2) the grayscale response time (Gray to Gray, GTG) of the negative liquid crystal is too long, poor smear is easy to occur when rapidly switching the pictures, and the fineness of the picture is poorer too;

(3) the silver glue is in contact with CF pol., has a section difference, and is easy to generate fitting light leakage when attaching to a cover glass;

(4) the negative liquid crystal is prone to stain defects;

(5) a special low-resistance CF pol. is required, both the type and performance of the Pol. are specially required, and the product cost is increased.

The TDDI product using the display substrate provided by the embodiment of the present application can adopt positive liquid crystal and ordinary CF Pol., which is beneficial to the increase of selectivity of the liquid crystal and Pol., reduces the product cost, and simultaneously reduces the drive voltage of the liquid crystal, further reduces the power consumption, and avoids the problem of overlong GTG time generated by negative liquid crystal, thereby enhances the fineness of the pictures, reduces various kinds of stains generated by the negative liquid crystal, and improves the phenomenon of fitting light leakage.

For example, the base substrate 101 is made of a material comprising glass or plastic.

The black matrix layer 102 may be made of an organic or inorganic material, for preventing light leakage of the display device.

The color resistance layer 103 obtains three primary colors of red, green, and blue generally by using a pigment or a dye as a colorant.

Figure 2:
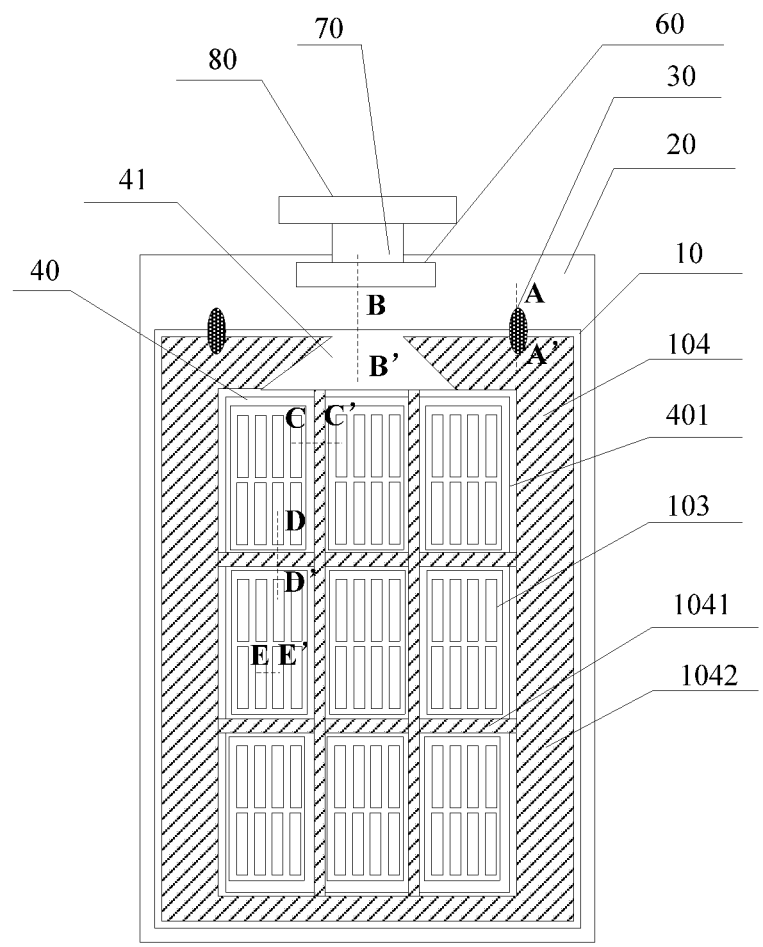
FIG. 2 is a schematic structural diagram showing a display panel according to an embodiment of the present disclosure.
Figure 3:
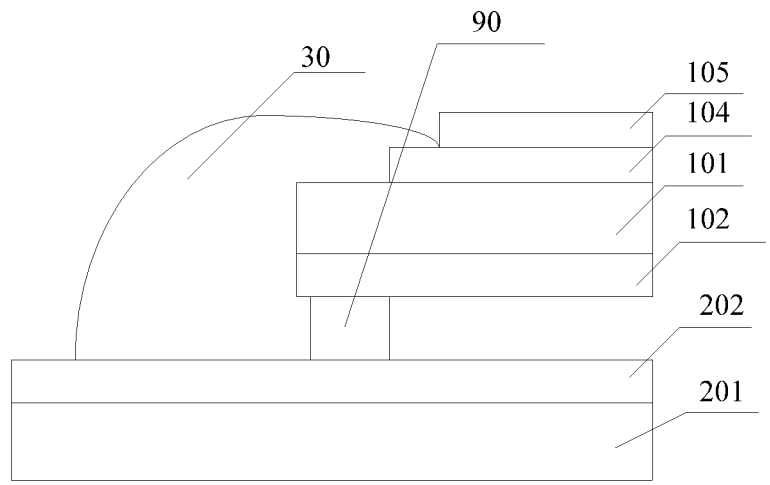
FIG. 3 is a sectional view taken along line A-A' of FIG. 2.

In some embodiments of the present application, for example, as shown in FIG. 2, an orthogonal projection of the electrostatic transmission layer 104 on the base substrate 101 does not overlap with an orthogonal projection of the color resistance layer 103 on the base substrate 101. In addition, an orthogonal projection of the black matrix layer 102 on the base substrate 101 covers the orthogonal projection of the electrostatic transmission layer 104 on the base substrate 101.

In some embodiments of the present application, the electrostatic transmission layer 104 is made of a material including Indium-Tin Oxide (ITO), metal, and graphene.

In some embodiments of the present application, the electrostatic transmission layer 104 comprises: a plurality of electrostatic transmission units arranged in a matrix.

In some embodiments of the present application, the display substrate further comprises a polarizer 105 located on a side of the electrostatic transmission layer 104 away from the base substrate 101.

Based on the inventive concept of the foregoing, an embodiment of the present application provides a display panel. FIG. 2 is a schematic structural diagram showing the display panel provided as above, and FIGS. 3 to 7 are sectional views taken along line A-A', B-B', C-C', D-D', and E-E' of FIG. 2, respectively. As shown in FIGS. 2-7, the display panel provided in the embodiment of the present application comprises the display substrate 10 as stated above, and a counter substrate 20 and a connection electrode 30 arranged opposite to the display substrate.

The counter substrate 20 comprises a counter substrate base 201 and a grounding layer 202 arranged on the counter substrate base 201.

The connection electrode 30 is configured to connect the electrostatic transmission layer 104 in the display substrate 10 with the grounding layer 202.

The display panel provided by the embodiment of the application, by providing the electrostatic transmission layer 104 on the second surface of the base substrate 101 and connecting the electrostatic transmission layer 104 with the grounding layer 202 of the counter substrate 20 through the connection electrode 30, enables the static electricity generated by the display substrate 10 to be quickly led out through the electrostatic transmission layer 104, thereby effectively preventing bad phenomena such as static electricity when peeling off the film.

In some embodiments of the present application, the connection electrode 30 includes a silver glue dot, a conductive cloth and a conductive tape.

In some embodiments of the present application, the display panel comprises a display area 40 and a non-display area 41 surrounding the display area 40, the display area 40 comprises a plurality of touch electrodes 401 and a plurality of drive signal lines 402, and adjacent touch electrodes 401 are connected by the drive signal lines 402.

The electrostatic transmission layer 104 comprises a first transmission region 1041 and a second transmission region 1042, the first transmission region 1041 is located in the display area 40, and the second transmission region 1042 is located in the non-display area 41.

As shown in FIGS. 2, 5, 6 and 7, orthographic projections of the first transmission region 1041 and the touch electrode 401 on the base substrate 101 do not overlap, and orthographic projections of the first transmission region 1041 and the drive signal line 402 on the base substrate 101 do not overlap.

Figure 4:
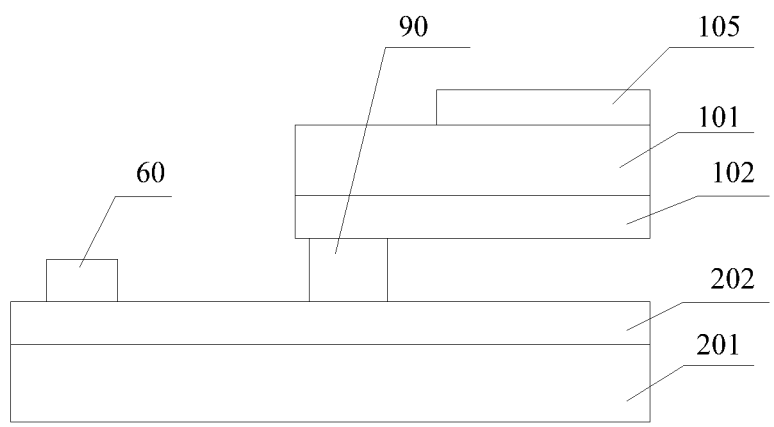
FIG. 4 is a sectional view taken along line B-B' of FIG. 2.
Figure 5:
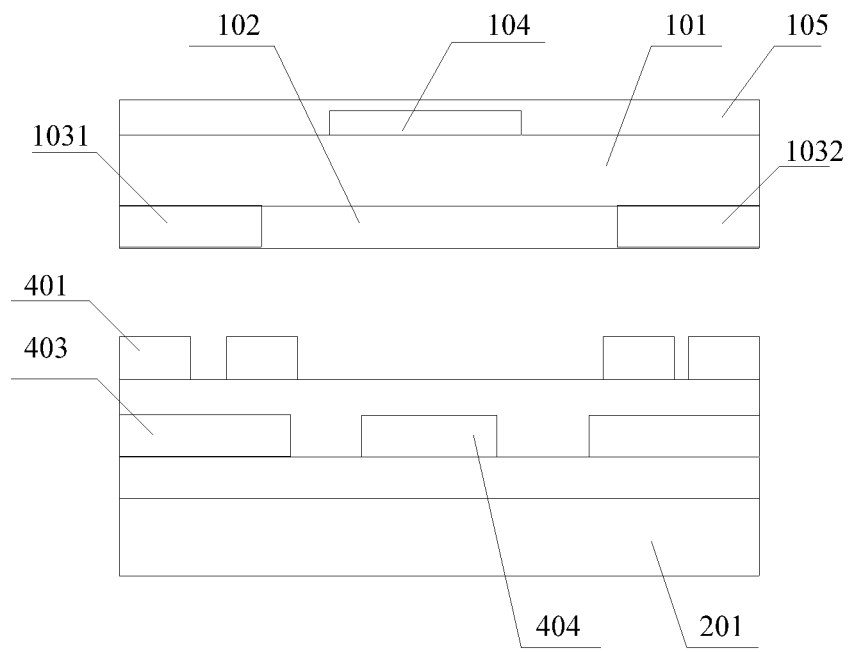
FIG. 5 is a sectional view taken along line C-C' of FIG. 2.
Figure 6:
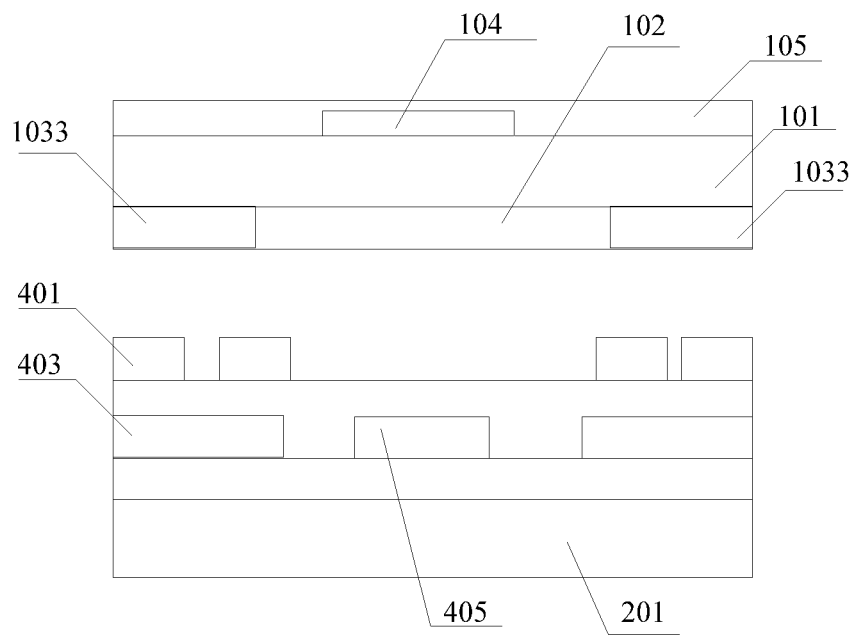
FIG. 6 is a sectional view taken along line D-D' of FIG. 2.

As shown in FIGS. 2 and 4, orthographic projections of the second transmission region 1042 and the drive signal line 402 on the base substrate 101 do not overlap, so as to ensure that the touch effect is not affected.

In an example, a density of matrix arrangement of the electrostatic transmission layer 104 can be increased or decreased appropriately according to the effect of the touch function.

In a TDDI product using the display panel according to the embodiment of the present application, the touch electrode 401 is a common electrode. Components that make up the TDDI product are: liquid crystal, Seal glue, PS, Tx lines of Array, and other basic components, which will not be described here again.

In some embodiments of the present application, the display area 40 further comprises a plurality of pixel electrodes 403 and a plurality of data signal lines 404, and the pixel electrodes 403 and the data signal lines 404 are arranged on the same layer as the drive signal lines 402.

In some embodiments of the present disclosure, the display area 40 further comprises a plurality of gate signal lines 405, and the pixel electrodes 403 are arranged on different layers from the gate signal lines 405.

In some embodiments of the present application, the display panel further comprises a liquid crystal layer arranged between the display substrate 10 and the counter substrate 20, and the liquid crystal layer adopts positive liquid crystal molecules.

Based on the inventive concept of the foregoing embodiment, an embodiment of the present application further provides a display device comprising the display panel as stated above.

The display device according to the embodiment of the present application can be any product or component with a display function, such as a mobile phone, a tablet computer, a television, a display, a notebook computer, a digital photo frame, a navigator.

Based on the inventive concept of the foregoing embodiment, the embodiment of the present application further provides a method of manufacturing a display substrate, so as to overcome the bad phenomena such as static electricity when peeling off the film, in the related display substrate. FIG. 8 is a flowchart showing a method of manufacturing a display substrate according to an embodiment of the present disclosure. As shown in FIG. 8, the method of manufacturing a display substrate comprises the following the steps.

At step 801, a base substrate comprising a first surface and a second surface opposing to each other is provided.

In an example, the base substrate is a glass substrate.

At step 802, a black matrix layer and a color resistance layer are formed on the first surface of the base substrate, wherein the black matrix layer and the color resistance layer are arranged on the same layer.

In an example, the black matrix layer may be made of an organic or inorganic material, for preventing light leakage of the display device.

The color resistance layer obtains three primary colors of red, green and blue by generally using a pigment or dye as a colorant.

At step 803, an electrostatic transmission layer is formed on the second surface of the base substrate, wherein the electrostatic transmission layer is configured to lead out the static electricity generated by the base substrate, wherein an orthographic projection of the electrostatic transmission layer on the base substrate does not overlap with an orthographic projection of the color resistance layer on the base substrate.

In an example, forming an electrostatic transmission layer on the second surface of the base substrate comprises forming the electrostatic transmission layer on the second surface of the base substrate by a coating etching process.

In an example, a layer of ITO may be deposited on the second surface of the base substrate by means of coating, magnetron sputtering, thermal evaporation, or Plasma Enhanced Chemical Vapor Deposition (PECVD), to obtain an ITO material layer, and then the ITO material layer is processed by a single patterning process to obtain the electrostatic transmission layer.

The single patterning process comprises photoresist coating, exposure, development and photoresist strip, therefore, processing the ITO material layer by the single patterning process to obtain the touch electrode layer, comprises: coating a layer of photoresist on the second surface of the base substrate to obtain a photoresist layer, exposing the photoresist layer by using a mask to form a fully exposed area and a non-exposed area on the photoresist layer, then making a developing process such that the photoresist in the fully exposed area is completely removed and the photoresist in the non-exposed area is completely retained, etching an area corresponding to the fully exposed area on the substrate by using an etching process, and finally peeling off the photoresist in the non-exposed area, wherein the ITO structure retained on the substrate is the pattern of the electrostatic transmission layer.

In an example, an orthogonal projection of the electrostatic transmission layer on the base substrate does not overlap with an orthogonal projection of the color resistance layer on the base substrate, and an orthogonal projection of the black matrix layer on the base substrate covers the orthogonal projection of the electrostatic transmission layer on the base substrate.

Based on the inventive concept of the foregoing embodiments, an embodiment of the present application further provides a method of manufacturing a display panel, so as to overcome bad phenomena such as static electricity when peeling off the film, in the related display substrate. FIG. 9 is a flowchart showing a method of manufacturing a display panel according to an embodiment of the present disclosure. As shown in FIG. 9, the method of manufacturing a display panel comprises the following steps.

At step 901, a display substrate is formed, comprising: providing a base substrate comprising a first surface and a second surface opposing to each other; forming a black matrix layer and a color resistance layer on the first surface of the base substrate, wherein the black matrix layer and the color resistance layer are arranged on the same layer; and forming an electrostatic transmission layer on the second surface of the base substrate, wherein the electrostatic transmission layer is configured to lead out static electricity generated by the base substrate, and wherein an orthographic projection of the electrostatic transmission layer on the base substrate does not overlap with an orthographic projection of the color resistance layer on the base substrate.

For example, the electrostatic transmission layer of the display substrate should be designed at a position where gaps between adjacent touch electrodes of the counter substrate are opposite to each other, and the wider a line width of the electrostatic transmission layer, the more beneficial to electrostatic discharge. In addition, in order to avoid the influence of the electrostatic transmission layer to the drive signal lines, the position of the electrostatic transmission layer needs to be kept away from the position opposite to the drive signal lines, and for example, the electrostatic transmission layer opposite to the fan-out area of the counter substrate shall be subjected to an abnormality process.

For example, forming an electrostatic transmission layer on the second surface of the base substrate comprises: forming the electrostatic transmission layer on the second surface of the base substrate by a coating etching process.

In an example, a layer of ITO may be deposited on the second surface of the base substrate by means of coating, magnetron sputtering, thermal evaporation, or PECVD, etc., to obtain an ITO material layer, and then the ITO material layer may be processed by a single patterning process to obtain the electrostatic transmission layer.

The single patterning process comprises photoresist coating, exposure, development and photoresist strip, therefore, processing the ITO material layer by the single patterning process to obtain the touch electrode layer, comprises: coating a layer of photoresist on the second surface of the base substrate to obtain a photoresist layer, exposing the photoresist layer by using a mask to form a fully exposed area and a non-exposed area on the photoresist layer, then making a developing process such that the photoresist in the fully exposed area is completely removed and the photoresist in the non-exposed area is completely retained, etching an area corresponding to the fully exposed area on the substrate by using an etching process, and finally peeling off the photoresist in the non-exposed area, wherein the ITO structure retained on the substrate is the pattern of the electrostatic transmission layer.

At step 902, a counter substrate comprising a grounding layer is formed.

When the counter substrate is formed, it is needed to determine touch electrode patterns and drive signal line patterns on the counter substrate according to performance requirements of the product. It should be noted that the larger the gap between adjacent touch electrodes, the more beneficial to the manufacturing of the electrostatic transmission layer of the display substrate, to avoid capacitance abnormality caused by a process deviation of the subsequent assembly (Ass'y). In addition, at the position of the gap between adjacent touch electrodes, it is desired that no drive signal line is designed.

At step 903, a connection electrode for connecting the electrostatic transmission layer with the grounding layer is formed.

In an example, the connection electrode comprises a silver glue dot, a conductive cloth and a conductive tape.

The connection of the silver glue dot should have a function of making the display substrate and the counter substrate conductive. Therefore, one end of the silver glue dot should be lapped on the grounding layer of the counter substrate, and the other end of the silver glue dot should be lapped on the electrostatic transmission layer of the display substrate. If the section difference of the silver glue point is not large, it may be considered to lap the polarizer of the display substrate at the same time.

At step 904, the display substrate is aligned with the counter substrate.

At step 905, a liquid crystal layer is filled between the display substrate and the counter substrate.

In an example, the TDDI product is finally manufactured through processes of liquid crystal dripping, frame sealing, cutting, polarizer protective film pasting, binding and the like. The related processes are common processes of the thin film transistor liquid crystal display panel and thus are not repeated herein.

The position and matrix density of the electrostatic transmission layer should be an blueprint without reducing the influence to the touch function, and the changes in the position, matrix density, shape, distribution mode and the like of the electrostatic transmission layer without considering the influence to the touch function can be considered to be in line with the spirit of the present application, and therefore fall within the scope of protection of the present application.

In the description of the embodiments of the present application, it should be understood that orientations or position relations indicated by the terms "middle", "up", "down", "front", "rear", "vertical", "horizontal", "top", "bottom", "inside", "outside", etc. are the orientations or position relations based on what shown in the drawings, only for the convenience of description and simplicity of description, but do not indicate or imply that the devices or elements must have the specific orientations and be constructed and operated in the specific orientations, and thus, should not be construed as limiting the present application.

In the description of the embodiments of the present application, it should be noted that the terms "mounted," "coupled," and "connected" are to be construed broadly and may be, for example, a fixed connection, a detachable connection, or an integral connection unless otherwise explicitly stated or limited; can be mechanically or electrically connected; can be connected directly or indirectly through intervening media, or can be interconnected between two elements. The specific meanings of the above terms in this application will be understood to be a specific case for those of ordinary skill in the art.

Although the embodiments disclosed in the present application are described above, they are embodiments only for the purpose of facilitating understanding of the present application and are not intended to limit the present application. It will be understood by those skilled in the art that any modification and change in form and details may be made therein without departing from the spirit and scope of the disclosure of the present application, and the scope of patent protection of the present application is still determined by the attached claims.

What is claimed is:

1. A display panel comprising:
   a display substrate comprising:
      a base substrate; and
      a black matrix layer, a color resistance layer, and an electrostatic transmission layer arranged on the base substrate,
      wherein the base substrate comprises a first surface and a second surface opposing to each other, the black matrix layer and the color resistance layer are arranged on the first surface of the base substrate and arranged on the same layer, and the electrostatic transmission layer for leading out static electricity generated by the base substrate is arranged on the second surface of the base substrate, wherein an orthographic projection of the electrostatic transmission layer on the base substrate does not overlap with an orthographic projection of the color resistance layer on the base substrate,
   a counter substrate arranged opposite to the display substrate and a connection electrode, wherein:
   the counter substrate comprises a grounding layer; and
   the connection electrode is configured to connect the electrostatic transmission layer in the display substrate with the grounding layer;
   wherein:
   the display panel further comprises a display area and a non-display area surrounding the display area, the display area includes a plurality of touch electrodes and a plurality of drive signal lines, and adjacent touch electrodes are connected by the drive signal lines;
   the display area comprises a plurality of pixel electrodes and a plurality of data signal lines, and the pixel electrodes, the data signal lines, and the drive signal lines are arranged on the same layer;
   the electrostatic transmission layer comprises a first transmission portion and a second transmission portion, the first transmission portion is located in the display area, and the second transmission portion is located in the non-display area;
   orthographic projections of the first transmission portion and the touch electrode on the base substrate do not overlap, and orthographic projections of the first transmission portion and the drive signal line on the base substrate do not overlap; and
   orthographic projections of the second transmission portion and the drive signal line on the base substrate do not overlap,
   wherein the electrostatic transmission layer and the touch electrodes are arranged in different layers.

2. The display panel according to claim 1, wherein an orthographic projection of the black matrix layer on the base substrate covers the orthographic projection of the electrostatic transmission layer on the base substrate.

3. The display panel according to claim 1, wherein the electrostatic transmission layer is made of a material comprising indium tin oxide, metal, and graphene.

4. The display panel according to claim 1, wherein the electrostatic transmission layer comprises: a plurality of electrostatic transmission units arranged in a matrix.

5. The display panel according to claim 1, wherein the display substrate further comprises a polarizer located on a side of the electrostatic transmission layer away from the base substrate.

6. The display panel according to claim 1, wherein the connection electrode comprises a silver glue dot, a conductive cloth, or a conductive tape.

7. The display panel according to claim 1, wherein the connection electrode comprises a silver glue dot, and one end of the silver glue dot is lapped on the grounding layer of the counter substrate, and the other end of the silver glue dot is lapped on the electrostatic transmission layer of the display substrate.

8. The display panel according to claim 1, wherein:
   the display panel further comprises a liquid crystal layer arranged between the display substrate and the counter substrate; and
   the liquid crystal layer adopts positive liquid crystal molecules.

9. The display panel according to claim 1, wherein an orthographic projection of the black matrix layer on the base substrate covers the orthographic projection of the electrostatic transmission layer on the base substrate.

10. The display panel according to claim 1, wherein the electrostatic transmission layer comprises: a plurality of electrostatic transmission units arranged in a matrix.

11. The display panel according to claim 1, wherein the display substrate further comprises a polarizer located on a side of the electrostatic transmission layer away from the base substrate.

12. A display device comprising: the display panel according to claim 1.

13. A method of manufacturing a display panel, comprising:
forming a display substrate, comprising:
providing a base substrate, wherein the base substrate comprises a first surface and a second surface opposing to each other;
forming a black matrix layer and a color resistance layer on the first surface of the base substrate, wherein the black matrix layer and the color resistance layer are arranged on the same layer; and
forming an electrostatic transmission layer on the second surface of the base substrate, wherein the electrostatic transmission layer is configured to lead out static electricity generated by the base substrate, and wherein an orthographic projection of the electrostatic transmission layer on the base substrate does not overlap with an orthographic projection of the color resistance layer on the base substrate;
forming a counter substrate comprising a grounding layer;
forming a connection electrode for connecting the electrostatic transmission layer with the grounding layer;
aligning the display substrate with the counter substrate; and
filling a liquid crystal layer between the display substrate and the counter substrate, wherein:

the display panel further comprises a display area and a non-display area surrounding the display area, the display area includes a plurality of touch electrodes and a plurality of drive signal lines, and adjacent touch electrodes are connected by the drive signal lines;
the display area comprises a plurality of pixel electrodes and a plurality of data signal lines, and the pixel electrodes, the data signal lines, and the drive signal lines are arranged on the same layer;
the electrostatic transmission layer comprises a first transmission portion and a second transmission portion, the first transmission portion is located in the display area, and the second transmission portion is located in the non-display area;
orthographic projections of the first transmission portion and the touch electrode on the base substrate do not overlap, and orthographic projections of the first transmission portion and the drive signal line on the base substrate do not overlap; and
orthographic projections of the second transmission portion and the drive signal line on the base substrate do not overlap,
wherein the electrostatic transmission layer and the touch electrodes are arranged in different layers.

14. The manufacturing method according to claim 13, wherein forming the electrostatic transmission layer on the second surface of the base substrate comprises:
forming the electrostatic transmission layer on the second surface of the base substrate by a coating etching process.

* * * * *